March 6, 1956  E. J. GREGER  2,737,424
ODOMETER SHAFT RETAINER
Filed Feb. 3, 1953
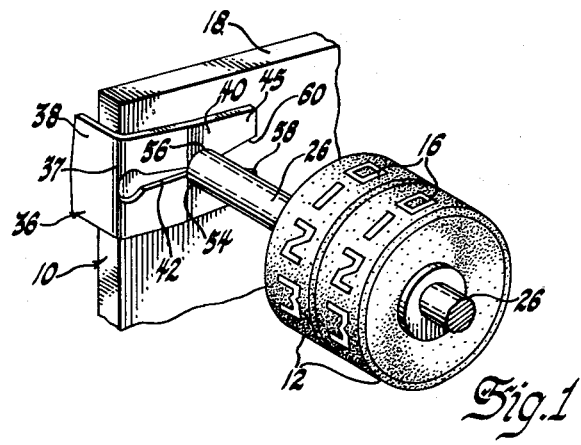
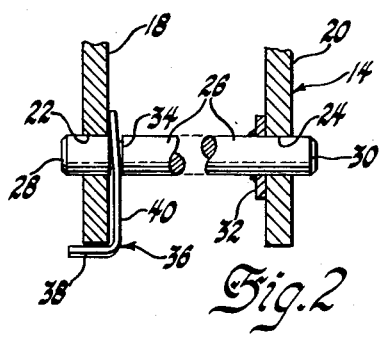
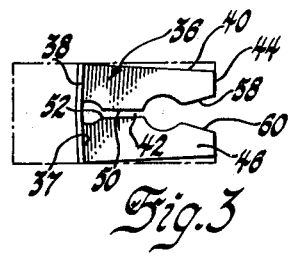
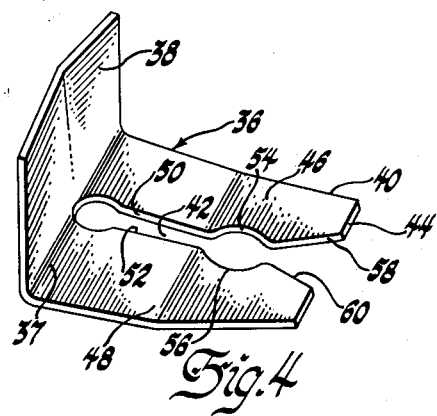
INVENTOR
Edward J. Greger
BY
Willits, Helwig & Baillio
ATTORNEYS

# United States Patent Office 2,737,424
Patented Mar. 6, 1956

2,737,424

ODOMETER SHAFT RETAINER

Edward J. Greger, Flint, Mich., assignor to General Motors Corporation, Detroit, Mich., a corporation of Delaware Application February 3, 1953, Serial No. 334,880

2 Claims. (Cl. 308—163)

The present invention relates to mounting means, and more particularly to means for retaining an odometer shaft in position.

To manufacture odometers on a commercial scale for installation on automotive vehicles, they must be produced as economically as possible. In order to achieve this objective, it is desirable that the odometer have as few parts as possible without impairing its accuracy and durability. It is also highly desirable that the parts that are employed may be assembled without requiring time consuming operations. Although numerous odometers have been devised for use on automobiles, considerable trouble has been experienced in the assembling and servicing of these structures as a result of failures in the mounting means for the odometer shaft.

It is proposed to provide mounting means for an odometer shaft that is easy and economical to assemble and is reliable in operation. This is accomplished by employing a mounting clip having a pair of legs that are adapted to resiliently embrace shoulder means on the odometer shaft and thereby retain the shaft in position. The legs of the clip are relatively rigid in the plane of the legs but are resiliently deflectable in a direction normal to the plane. The clip is provided with an end portion that is angularly disposed with respect to the legs to provide a spring action which will cause the legs to resiliently embrace the shoulder means and the legs are resilently curved in a direction normal to the plane so as to hold the shaft in the frame with proper end play.

In the drawings:

Figure 1 is a fragmentary perspective view of an odometer embodying the present invention.

Figure 2 is a cross-sectional plan view of shaft mounting means embodying the present invention.

Figure 3 is a side elevational view of a clip employed for practicing the present invention and indicating the developed view in dash and dot lines.

Figure 4 is a perspective view of the clip of Figure 3.

Referring to the drawings in more detail, an odometer 10 comprising a plurality of indicator cylinders 12 is supported by means of a framework 14. The cylinders 12 have indicia 16 thereon which may be graduated to indicate the distance which a vehicle has traveled.

The framework 14 may be mounted in any desired location such as in a speedometer housing for an automobile and its comprises a pair of parallel spaced walls 18 and 20. The walls 18 and 20 may be provided with openings or bearings 22 and 24 respectively. The bearings 22 and 24 are disposed in substantial axial alignment with each other and rotatably receive a cylindrical shaft 26.

The opposite ends 28 and 30 of the shaft 26 are disposed in the bearings 22 and 24 so as to permit said shaft 26 to rotate freely. The indicator cylinders 12 are positioned on the shaft 26 so that the indicia 16 thereon may be readily observed. The indicator cylinders 12 can be of conventional construction and they may be actuated by a standard odometer driving mechanism.

One end 30 of the shaft 26 is provided with means such as the enlarged collar 32 that engages one of the walls 20. The shaft 26 may be assembled in the bearings 22 and 24 by any suitable means. For instance, one of the walls 18 or 20 may be movable to allow the shaft to be placed in position or the bearing 22 may be adapted to allow the shaft 26 to be inserted at an angle and moved axially therethrough until the end 30 can be inserted between the walls 18 and 20 and placed in the bearing 24 whereupon the shaft 26 will be moved axially until collar 32 engages the wall 20. Thus when the shaft 26 is in position it is free to rotate, but the collar 32 abutting against the wall 20 will limit the axial movement of the shaft 26 in one direction.

The opposite end 28 of the shaft 26 is provided with suitable shoulder means such as the annular recess 34. To facilitate assembling the odometer 10, it is desirable that this shoulder means permit axial movement of the shaft 26 in the opening 22. This will make it possible for the shaft 26 to slide through the opening 22 far enough to permit the opposite end 30 of the shaft 26 to be placed in the opening 24. The recess 34 is positioned in the shaft 26 so as to be adjacent the wall 18 when the collar 32 engages the wall 20. A clip 36 is positioned in the annular recess 34 so as to engage the wall 18 and limit axial movement of the shaft 26. It is thus apparent that the clip 36 and collar 32 restrict the axial movement of the shaft 26 without interfering with the rotation thereof.

The clip 36 comprises a strap bent along a line 37 extending transversely thereof so as to form two members 38 and 40 disposed at substantially right angles to each other. One of the members 40 has a slot 42 which extends longitudinally inwardly from one end 44 thereof and terminates adjacent the other member 38 to form a pair of legs 46 and 48. The legs 46 and 48 are much wider than they are thick and therefore they will be relatively rigid against bending the plane of the legs; however, they will be resiliently deflectable in directions normal thereto. The inner edges 50 and 52 of each of the legs 46 and 48 have notches 54 and 56. The notches 54 and 56 are substantially cylindrical in shape and are adapted to engage the annular recess 34 in the shaft 26. In order to assemble the odometer 10 more quickly the outer ends of the sides of the legs 46 and 48 are beveled at 58 and 60. Therefore the legs 46 and 48 will be wedged apart as the clip 36 is pushed into place on the annular recess 34. If desired the legs 46 and 48 of the clip 36 may be provided with a small amount of camber in a direction substantially normal to the plane thereof. When the clip 36 is in position, the legs 46 and 48 will be straightened out. By compressing the legs 46 and 48 end play will be reduced since the shaft 26 will be urged axially toward the wall 20 causing the collar 32 to positively engage the wall 20 at all times.

To provide for resilient movement of the legs 46 and 48 toward and away from each other, or in other words for relative movement in the plane of the legs, the slot 42 extends the full length of the member 40 and terminates adjacent the other member 38. Thus since the legs 46 and 48 are rigid in the plane, any movement will result from flexing of the end member 38 about a line intersecting the slot 42. Since all of the flexing occurs in directions normal to the plane of the members 38 and 40, neither member will be stressed beyond the elastic limit. Therefore spreading the legs 46 and 48 during assembly will not cause a permanent set to occur in any portion of the clip 36 and the legs 46 and 48 will resiliently engage the recess 34 at all times. If it is desired to increase the tension of the legs on the recess, the end member 38 may be bent so as to place the legs closer together.

To assemble the odometer 10, the end 28 of the shaft 26 having the recess 34 is inserted through the opening 22 and pushed axially therethrough until the opposite end 30 of the shaft 26 can be placed in the opening 24. The shaft 26 is then positioned with the collar 32 engaging the wall 20. This will place the recess 34 adjacent the other wall 18 and the clip 36 may be pusehd into place. Thus the clip 36 and collar 32 prevent the shaft 26 from sliding axially in either direction. If the legs 46 and 48 are given some camber they will be compressed between the wall 18 and the recess 34. This will resiliently maintain the collar 32 against the wall 20 and eliminate rattling resulting from end play.

While but one embodiment has been illustrated and described, it will be apparent to anyone skilled in the art that the invention may be embodied in numerous other specific forms than that described without departing from the spirit thereof. It is, therefore, desired that the present embodiment be considered in all respects illustrative and not restrictive, reference being had to the appended claims rather than to the foregoing description to determine the scope of the invention.

What is claimed is:

1. Mounting means comprising a frame having a pair of parallel spaced walls, each of said walls having similar openings positioned therein to register with the similar opening in the other of said walls to form a pair of aligned bearings, a shaft positioned between said walls and having the opposite ends thereof rotatably positioned in said bearings, an annular collar positioned on said shaft to engage one of said walls, said shaft also having an annular shoulder positioned adjacent one of said walls, a clip positioned on said shaft to engage the wall adjacent thereto, said clip comprising an end member having a pair of spaced legs projecting substantially normal therefrom, said legs straddling said shaft and engaging said shoulder and the wall adjacent thereto, said legs being resiliently deflectable in the plane thereof by bending said end member about an axis extending longitudinally thereof and intersecting the space between said legs, said legs being positioned to embrace said shaft, said legs in their free position being normally curved in a direction orthogonal to the plane thereof and being compressed between said adjacent wall and said shoulder to resiliently bias said shaft in an axial direction and retain said collar against said wall.

2. Odometer shaft mounting means comprising a frame having a pair of parallel spaced walls, each of said walls having similar openings positioned therein to register with the similar opening in the other of said walls to form a pair of aligned bearings, a shaft for supporting odometer indicating means thereon, said shaft being positioned between said walls and having the opposite ends thereof rotatably positioned in said bearings, an annular collar positioned on said shaft to engage one of said walls, said shaft also having an annular shoulder positioned adjacent one of said walls, a clip positioned on said shaft to engage the wall adjacent thereto, said clip comprising a member having a pair of end portions positioned substantially orthogonal to each other, one of said end portions having an open ended slot extending longitudinally inwardly from one end thereof and terminating adjacent the other of said end portions to form a pair of legs which straddle said shaft and engage said shoulder and the wall adjacent thereto, said legs being resiliently deflectable in the plane thereof by bending said other end portion about an axis extending longitudinally thereof and intersecting the end of said slot, said legs in their free position being curved in a direction normal to the plane thereof for exerting an axial thrust on said shaft to retain said collar against said wall.

References Cited in the file of this patent

UNITED STATES PATENTS

| | | |
|---|---|---|
| 1,511,234 | Olsen | Oct. 14, 1924 |
| 1,672,195 | Berge | June 5, 1928 |
| 1,907,506 | Coburn | May 9, 1933 |
| 1,913,147 | Zuboty | June 6, 1933 |
| 2,512,691 | Smith et al. | June 27, 1950 |